United States Patent
Iwatschenko-Borho

(10) Patent No.: US 7,544,927 B1
(45) Date of Patent: Jun. 9, 2009

(54) METHODS AND APPARATUS FOR PERFORMANCE VERIFICATION AND STABILIZATION OF RADIATION DETECTION DEVICES

(75) Inventor: Michael Iwatschenko-Borho, Erlangen (DE)

(73) Assignee: Thermo Fisher Scientific Inc., Waltham, MA (US)

( * ) Notice: Subject to any disclaimer, the term of this patent is extended or adjusted under 35 U.S.C. 154(b) by 35 days.

(21) Appl. No.: 11/511,078

(22) Filed: Aug. 28, 2006

(51) Int. Cl.
*G12B 13/00* (2006.01)

(52) U.S. Cl. .................................. 250/252.1

(58) Field of Classification Search ............ 250/370.01, 250/252.1
See application file for complete search history.

(56) References Cited

U.S. PATENT DOCUMENTS

| | | | |
|---|---|---|---|
| 3,253,152 | A | 5/1966 | Lahr |
| 4,644,167 | A | 2/1987 | Sorber |
| 5,679,985 | A | 10/1997 | Brailey et al. |
| 6,689,293 | B2 | 2/2004 | McClellan et al. |
| 2001/0047185 | A1 | 11/2001 | Satz |
| 2002/0075992 | A1 | 6/2002 | Jiang |
| 2003/0089862 | A1 | 5/2003 | Jongen |
| 2006/0102845 | A1* | 5/2006 | Williams et al. ....... 250/363.03 |
| 2006/0219927 | A1* | 10/2006 | Venkataramani et al. ....... 250/370.11 |
| 2007/0138399 | A1* | 6/2007 | Simonetti et al. ...... 250/370.11 |
| 2007/0246663 | A1* | 10/2007 | Tahon et al. ............. 250/484.4 |

OTHER PUBLICATIONS

International Search Report, Nov. 21, 2008, pp. 1.

* cited by examiner

*Primary Examiner*—David P Porta
*Assistant Examiner*—Marcus H Taningco
(74) *Attorney, Agent, or Firm*—Chapin IP Law, LLC; Barry W. Chapin, Esq.

(57) ABSTRACT

The rare earth metal Lutetium in compound form is used in check sources of various shapes and sizes to calibrate and tune radiation detection devices. Radioactive Lutetium-176, a naturally occurring (non man-made) isotope forming part of the Lutetium compound, produces gamma energies of approximately 90, 200, and 300 kilo-electron Volts which are used in the calibration. Such gamma energies are close to the predominant spectral lines of special nuclear materials such as U-235 and Pu-239, which is to be monitored by radiation detection devices. Lutetium in a radioactive calibration source (which is either integrated into the radiation detection device or positioned close to it during calibration) provides benefits including that no reactor or accelerator is required during production or use, for the creation of man-made radioactivity, no dangerous radiation exposure occurs and (because of the long half-life of Lu-176) the radioactive calibration source essentially never needs to be replaced. Moreover, the handling of such a source is much less restrictive and costly than that of a conventional man-made radioactive isotope.

22 Claims, 12 Drawing Sheets

METHODS AND APPARATUS FOR PERFORMANCE VERIFICATION AND STABILIZATION OF RADIATION DETECTION DEVICES

FIELD OF THE INVENTION

This invention relates to radiation sources for calibrating radiation detection devices, and more particularly to Lutetium-containing check sources, their manufacturing, and their use.

BACKGROUND

Requirements of the Untied States Department of Homeland Security include a need for devices capable of sensitive detection of gamma rays originating from hidden radioactive material (e.g. in accordance with standards of the American National Standards Institute (ANSI) such as ANSI N42.32). As well, many steel plants and scrap yards are concerned about the potentially dangerous melting of so-called orphane sources which might be included in the in or outbound scrap material. Even landfills and waste incineration plants equip their gates and personal with monitors for the detection of such radioactivity. Commercially available high sensitivity portable or mobile gamma radiation meters can be deployed to detect very small amounts of radioactivity.

Some conventional radiation detection instruments simply display the number of detected gamma rays sensed (i.e., counted) by the device, while other conventional radiation detection devices are capable of measuring and displaying the dose rate of the gamma radiation field detected by the device. Operators of such devices can set alarm thresholds on absolute numbers of the detected particles per time unit or on the measured dose rate, depending upon the device used. Some radiation detection systems are configured to generate an alarm when the respective count or dose rate of gamma radiation exceeds a predetermined threshold related to background level.

Prior to actual use, and preferably on a regular basis during their useful life, radiation detection devices typically should be calibrated against a known standard. Calibration can require at least periodic exposure of a radiation detection device to a radioactive source exhibiting a similar spectra of energy as those radioactive sources of concern.

Conventional manufacturing of radioactive sources for calibration of radiation detectors (e.g., so-called check sources) typically requires access to a reactor or an accelerator to produce the radioactive material. The man-made isotopes used as check sources typically exhibit a half-life between a few minutes and several years; those with short half-lives require frequent replacement.

For many reasons, radioactive sources often need to be very strong (e.g., emitting a high amount of radiation). Accordingly, such sources require special handling during use as well as storage. Government authorities have established rules and regulations in order to protect workers and the public from any possible danger from these sources. Unfortunately, this can hamper the possession and usage of even small amounts of such radioactive material.

Commercially available high sensitivity, stationary, portable or mobile gamma radiation meters can easily detect very small increases in the strength of a gamma radiation field. However, a problem arises when such devices are deployed to users who normally do not handle radioactive materials and who therefore do not own corresponding check sources to properly test the performance of the detectors.

As an alternative to the use of man-made radioactive material, certain naturally occurring radioactive materials have been used to verify the performance of radiation detection devices. However, the only natural materials known to be used as check sources today are K-40, isotopes of the Th-232 decay chain, and isotopes of the U-238 decay chain.

Material such as incandescent mantles (Thorium), old watches (Radium) and fertilizer (Potassium K-40) can emit suitable levels of radioactivity for testing purposes. The elements Thorium and Uranium exhibit multiple spectral energies ranging up to 3 Megaelectron Volts; K-40 produces a single spectral line at about 1.5 Megaelectron Volts. However, these isotopes are not well suited to test portal monitors or pocket size scintillation detectors because their average gamma energy is significantly higher than the typical gamma energies of those isotopes of concern.

SUMMARY

Conventional radiation calibration sources suffer from a number of deficiencies as discussed above. For example, most known radiation sources for calibrating radiation detection devices have rather short half-lives. Accordingly, when used for calibration, this type of radiation detector calibration source must be frequently replaced. Also, as discussed above, certain conventional material used for calibration purposes is highly regulated by governmental agencies. Accordingly, it can be difficult to obtain appropriate governmental clearance for use of certain radioactive material even for the legitimate purpose of calibrating sensitive and sophisticated devices used for detecting the presence of highly controlled matter such as enriched Uranium or Plutonium or dangerous orphane industrial sources which might be shielded by a transport container or other surrounding material.

Techniques and apparatus of the present invention as discussed herein differ from those discussed above as well as other techniques known in the prior art. In particular, embodiments herein include use of the natural radioactivity contained in the rare earth metal Lutetium as a source for calibrating radiation detection devices.

Lutetium typically occurs in very small amounts in nearly all minerals containing yttrium, and is present in monazite to the extent of about 0.003%. Lutetium can be prepared by the reduction of anhydrous $LuCl_3$ or $LuF_3$ by an alkali or alkaline earth metal. Naturally occurring Lutetium contains 2 different isotopes: stable Lutetium-175 with an abundance of 97.4%, and radioactive Lutetium-176 with an abundance of 2.6% and a half-life of around $3.7 \times 10^{10}$ years (i.e., 37 billion years). Accordingly, a Lutetium-based calibration source essentially never needs to be replaced.

Another reason to produce test sources based on natural Lutetium is its low specific radioactivity (e.g. approximately 48 Becquerels/gram for $Lu_2O_3$), which is low so as not to be a health concern. For comparison, a conventional man-made isotope Cs-137 (Half life 30 years) shows a specific activity of about $3.2 \times 10^{12}$ Becquerels/gram (87 Ci/gram), which can cause severe health damage to anybody who gets exposed to this radiation even for a short period of time.

Additionally, use of material including Lutetium-176 (e.g., a Lutetium compound and/or Lutetium-176 in its elemental form) as a calibration source provides advantages concerning the gamma spectra. Its energies at about 300 kilo-electron Volts, about 200 kilo-electron Volts, and about 90 kilo-electron Volts are close in approximation to the predominant spectral lines expected from highly regulated nuclear materials such as U-235 and Pu-239. Conventional techniques involve use of "substitutes" (rather than U-235 or Pu-239)

such as Co-57 and Ba-133 as calibration sources, but these latter materials unfortunately have a short half-life.

Use of gamma energy in this spectral region around 90, 200, and 300 kilo-electron Volts (as provided by gamma radiation from Lutetium) enables radiation detection devices to be more precisely calibrated than when using non-matching spectral regions. Thus, embodiments herein enable radiation detection devices to be tested under more realistic conditions such as an expected spectral energy associated with materials to be detected.

Via calibration of a radiation detection device to 90, 200, and/or 300 kilo-electron Volts using a Lutetium calibration source, the radiation detection device can be (periodically, occasionally, repeatedly, etc.) calibrated or stabilized to correct for "fading" or "drifting" out of specification due to environmental factors such as temperature changes. For example, one typical radiation detection device includes a common inorganic scintillation detector such as one made from Thallium doped Sodium Iodide (NaI(Tl)). Such a detector can exhibit significant drift effects as a result of temperature changes, aging, and exposure to elements. Known methods for a stabilization of such detectors include the insertion or injection of man-made radioactive isotopes (e.g., Am-241 or Cs-137) to the scintillation detector. A drawback of this conventional use of these isotopes is the fact that, even though these materials emit a fairly low amount of radiation, they are man-made and may not be taken to certain places having a specific site regulation that strictly forbids the presence or usage of artificial radioactive material on such premises. Furthermore, use of Am-241 or Cs-137 permanently attached to a detector can prevent the detection of small amounts of these isotopes in an environment under test.

As an alternative to Am-241 or Cs-137, Potassium Chloride (e.g., KCl) can be used as a source for generating gamma radiation. Unfortunately, due to the low specific activity of KCl, to produce an appreciable amount of gamma energy to "interact" with a scintillator detector, would require use of rather large amounts of KCl as a calibration source. Thus, use of KCl as a calibration source is rather inconvenient.

In certain cases, a non-radioactive device such as an LED (Light Emitting Diode) can be used to calibrate portions of a radiation detector. For example, pulsed or continuous light can be used to stabilize a photo-detector device (e.g., a photomultiplier) to compensate for amplification drift of a photomultiplier and other circuit inaccuracies. However, a light source cannot be used to account for "inhomogeneities" in a crystal or scintillator (of a radiation detection device) that is used to convert gamma energy to corresponding photon energy detected by a photon detector.

Certain embodiments of the present invention include use of Lutetium in compound form as a check source for calibration of a gamma detector or a beta detector. For example, a radioactive calibration source according to embodiments herein includes non-toxic compounds such as Lu-Oxide, Lu-Carbonate, Lu-Chloride, etc. Such non-metallic compounds can be formed into a variety of useful shapes to calibrate radiation detection devices. For example, the radioactive calibration source can be formed into tablets, rods, discs, caps, rings, etc. In certain cases, the radioactive Lutetium calibration source is shaped to enable it to be in close proximity to or even in contact with detector material (e.g., a scintillator) of a radiation detection device.

Certain embodiments herein involve controlling a thickness of the Lutetium-based radioactive calibration source. For example, thickness of the Lu-compound can be limited in order to reduce or minimize self-absorption of radiation, which would prevent the radiation from reaching a detection device (e.g., a scintillator) of a radiation detection device. A scintillator of a radiation detection device can be encapsulated with a shroud-like structure made from Lutetium compound. The shroud-like Lutetium-based radioactive calibration source at least partially encapsulates a scintillator detector and provides gamma energy to calibrate the radiation detection device. The shroud can be thin enough to allow gamma radiation to pass through the shroud (e.g., the Lutetium-compound) and strike the scintillator. In certain cases, the shroud can be thin enough to enable detection of even low levels of external radiation in the presence of the Lutetium-based calibration source. Accordingly, a Lutetium-based radioactive calibration source can be continuously present during an operation of testing for the presence of radiation from other sources. Alternatively, a calibration source can be temporarily positioned or held in close proximity to a radiation detection device only during a calibration mode.

BRIEF DESCRIPTION OF THE DRAWINGS

The foregoing and other objects, features and advantages of the methods and apparatus will be apparent from the following description of particular embodiments, as illustrated in the accompanying drawings in which like reference characters refer to the same parts throughout the different views. The drawings are not necessarily to scale, emphasis instead being placed upon illustrating the principles of the methods and apparatus.

DETAILED DESCRIPTION OF PREFERRED EMBODIMENTS

One embodiment of the present disclosure is directed toward use of a rare earth element Lutetium in compound form to calibrate radiation detection devices. This rare earth metal contains a radioactive isotope Lutetium-176 with a natural abundance of about 2.6% that produces measurable radiation energy.

Radioactive Lutetium-176 produces gamma energies of about 90, 200, and 300 kilo-electron Volts. Such gamma energies are close to predominant spectral lines normally produced by so-called special nuclear materials such as U-235 and Pu-239 whose detection is desired, and also by their respective surrogates Co-57 and Ba-133, which have conventionally been used for calibration purposes. Radioactive Lutetium-176 has a half-life of 37 billion years. Accordingly, use of Lutetium in a radioactive calibration source provides a benefit that the radioactive calibration source essentially never needs to be replaced. Additionally, via exposure to a radioactive Lutetium calibration source, a radiation detection device can be precisely calibrated or tuned to detect highly regulated material such as enriched Uranium and Plutonium.

Figure 1:
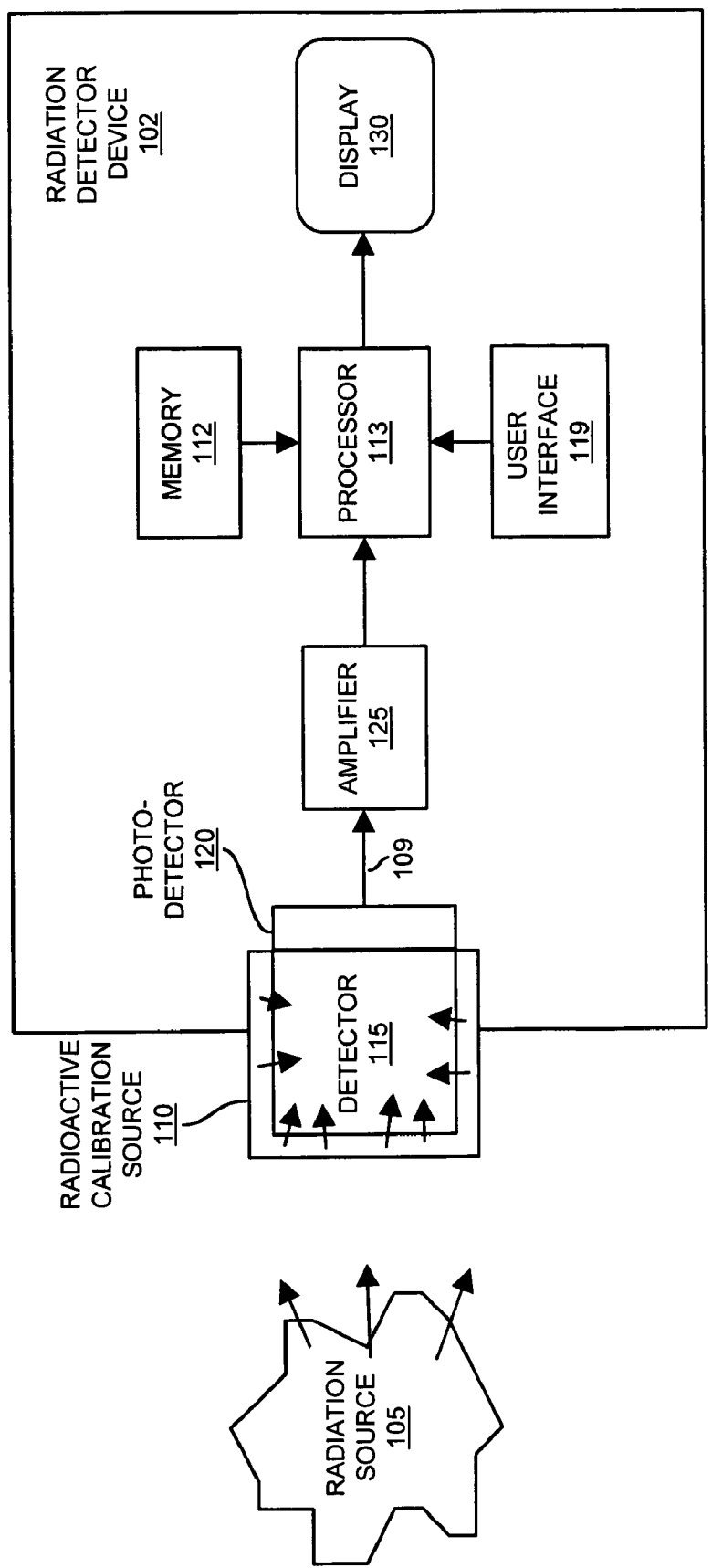
FIG. 1 is a diagram illustrating a radiation detection device and a calibration source according to embodiments herein.

FIG. 1 is a block diagram illustrating a radiation detection device 102 operating in environment under test 100 and which includes a radioactive calibration source 110 integrated into/with the detection device according to embodiments herein. The radiation detection device 102 includes a radioactive calibration source 110, detector 115, photo-detector 120, amplifier 125, processor 113, memory 112, user interface 119, and display 130. This configuration shown is a typical example of a radiation detector based on scintillating material. In an alternate configuration using a semiconductor (e.g. Germanium) detector, amplifier 125 would be directly coupled to the detector 115 without the need to include a photo-detector 120 (photo-multiplier or photodiode).

During general operation of the radiation detection device 102, a radiation source 105 emits gamma rays that pass through radioactive calibration source 110 and strike detector 115. When present, radioactive calibration source 110 emits radiation (e.g., gamma rays) that also strike detector 115. As will be discussed later in this specification, radiation detection device 102 can be calibrated in the presence as well as in the absence of radiation source 105.

Detector 115 converts the gamma rays into photons. Photo-detector 120 detects at least a portion of photons emitted by detector 115. Based on an amount of photons striking photo-detector 120, photo-detector 120 generates an electrical signal 109 to drive the input of amplifier 125. For example, a higher number of photons produce a higher pulse amplitude of electrical signal passed to the amplifier 125 along path 109.

Processor 113 receives the output (e.g., an amplified signal) of amplifier 125. The processor 113 monitors (via counts or other method) a level of radiation emitted by radiation source 105 and/or calibration source 110 (as the case may be) based on characteristics of the signal output from amplifier 125. Processor 113 drives an output device such as an LED or display screen 130 to provide an indication of an amount of gamma radiation emitted by radiation source 105.

In one embodiment, a composition of radioactive calibration source 110 includes a rare earth metal such as Lutetium-176 to calibrate radiation detection device 102. According to embodiments herein, elemental Lutetium can be combined with other elements such as Fluorine: to form $LuF_3$, Chlorine: to form $LuCl_3$, Carbon: to form $Lu_2(CO_3)_3 \cdot xH_2O$; Bromine: to form $LuBr_3$, Iodine: to form $LuI_3$, Oxygen: to form $Lu_2O_3$, Sulfur: to form $Lu_2S_3$, Tellurium: to form $Lu_2Te_3$, Nitrogen: to form $LuN$, etc. Such (non-metal) compounds are well-suited for applications in which the radiation detection device is a portable and/or handheld device. It is preferable to use non toxic compositions such as $LuCl_3$, $Lu_2O_3$; $Lu_2(CO_3)_3 \cdot xH_2O$. Of these, $Lu_2O_3$ has the highest relative weight amount of Lutetium within the molecule and can be considered as first choice for all applications where a high density is required in order to minimize the size of the check source. This is especially important in those cases, where the detector is rather small and the surface therefore possesses a strong convex curvature (e.g. small size cylinders). Using a high density Lutetium compound, significantly less material is required to achieve the same count rate, because the radioactivity is in closer average distance in respect to the detector.

For example, a radioactive calibration source 110 permanently integrated into the detector 115 (as opposed to being temporarily placed near detector 115 for calibration purposes) can add little appreciable weight to the radiation detection device 110 or at least does not render the radiation detection device 110 prohibitively heavy. In one embodiment, the Lutetium compound used to produce radioactive calibration source 110 can have a purity of between about 90% and 99.99% and relatively few or no other radioactive isotopes that generate radiation other than the Lutetium. The Lutetium compound such as Lutetium oxide is normally available with a purity level as low as 98%, which is suitable for embodiments herein. Use of Lutetium compound with an even lower purity level may be attractive because it may be available at lower cost than Lutetium compound of a higher purity.

Note that although FIG. 1 illustrates use of a radioactive calibration source 110 for purposes of testing radiation detection device 102, a Lutetium-based calibration source (e.g., radioactive calibration source 110) can be used to calibrate other types of radiation detection equipment as well.

In one embodiment a typical volume of between 2 and 50 cubic centimeters of Lutetium compound can be used to calibrate a corresponding radiation detection device. However, note that certain embodiments herein can require more or less amounts of radioactive Lutetium compound to calibrate a radiation detection device 102.

Since commercially available Lutetium compounds typically are available as a loose powder with a rather low density, it can be beneficial to compress the material when used as a calibration source. As an example, the manufacturing of high density Lutetium Oxide requires very high pressure typically exceeding 100 MegaPascals. For this purpose, the Lutetium Oxide powder (and/or material including the Lutetium oxide powder or Lutetium in its elemental form) is filled into a suitable cavity which might have the shape (e.g. diameter) of the final source or which might be sized and shaped as smaller parts (e.g. tablets, elements). In this latter embodiment, the tablets then can serve as "filling" for different types (e.g., sizes and shapes) of source casings. The high pressure can be applied to the powder until a density of the compressed body is at the desired value of more than 3 grams per cubic centimeter (such as up to the theoretical limit of 9.4 grams per cubic centimeter for Lutetium oxide compounds). In one embodiment, application of pressure to a Lutetium compound changes a density of the Lutetium compound (e.g., in powdered for) from a starting density of less than 3 grams/cubic centimeter to greater than 4 grams per cubic centimeter after application of the pressure.

In order to transform the resulting porous body (e.g., a compressed mass of Lutetium-compound powder) into a mechanically stable object, various types of treatments can be applied. One method is the exposure of the compressed mass of Lutetium to high temperatures of 500° C.-2000° C. in order to sinter the material into a mechanically stable system. In this case no additional material is added to the compressed mass of Lutetium and the mass becomes resistant to breaking apart. Accordingly, the weight of the radioactive calibration source can be kept to a minimum.

Either additionally or as an alternative, the compressed mass of Lutetium compound can be exposed to a solution composed of plastic material e.g. PMMA (Polymethylmethacrylat), PS (Polystyrol), PUR (Polyurethan), epoxy or other suitable plastic material dissolved in an organic solvent like Tetrahydrofuran or others. During exposure, the dissolved plastic fills up the pores of the compressed Lutetium oxide. After evaporation of the solvent the plastic material provides structural support so that the final shape of the compressed Lutetium oxide body is resilient to breaking apart (i.e., the mass of compressed or potentially uncompressed Lutetium oxide becomes mechanically stable). Further, radioactive calibration source 110 can be encased with low Z (atomic number) material (e.g. material which is essentially transparent for gamma radiation) such as plastic, aluminum, etc. for protection purposes. In one embodiment, a thickness of the low-Z material is on the order of 0.5-2 millimeters. The low-Z material can also potentially act as a mold or form factor aiding in production of different forms of the radioactive calibration source 110.

In certain circumstances, it can be useful to form a radioactive calibration source 110 which can be at least temporarily placed in close proximity to detector 115 for purposes of calibrating the radiation detection device 102 based on gamma (and/or beta) radiation emitted from the radioactive calibration source.

The detector 115 illustrated in FIG. 1 can be a cylindrical, protruding structure encased by a "tight fitting" calibration source 110 with little or no gap between the detector 115 and the radioactive calibration source 110 that encases multiple surfaces of detector 115. Accordingly, radioactive calibration source 110 at least partially encapsulates or shrouds detector 115.

As previously discussed, if the radioactive calibration source 110 is permanently integrated with detector 115 the thickness or weight per amount of surface area of calibration source 110 is limited so that radiation (e.g., gamma and beta radiation) from radiation source 105 is able to pass though radioactive calibration source 110 to detector 115 without being absorbed. In other words, the radioactive calibration source 110 should be sufficiently thin so as to limit the amount of gamma radiation absorption (or other absorption) by the radioactive calibration source 110. In such an embodiment, a maximum of about 2 grams of the Lutetium compound per square centimeter of surface area of the radioactive calibration source is used. For a density of the Lutetium compound (e.g. $Lu_2O_3$) of about 5 grams or less per cubic centimeter, this corresponds to a thickness of about 0.4 centimeters or less. However, other embodiments may have higher amounts of Lutetium compound such as more than about 5 grams per square centimeter of surface area.

Note that an amount of Lutetium oxide per surface area of radioactive calibration source 110 can vary depending on the application. For example, in one embodiment, a manufacturing facility forms at least one surface area of a fused mass of Lutetium compound to have a thickness in which the amount of Lutetium compound is less than five grams per square centimeter of surface area.

Also, note that the thickness (weight per area) of the radioactive calibration source 110 may be limited to a smaller value, such as when radiation detection device 102 is manufactured to detect lower energy radiation particles such as beta radiation. In such an embodiment, the radiation detection device 102 is used as a surface contamination detector (e.g., beta surface contamination probes or sample changers). Note that radiation detectors for measuring beta radiation are typically equipped with a thin entrance window (<10 milligrams/square centimeter). Such conventional detectors have been used for many decades and include devices such as gas-filled Geiger-Mueller counters, proportional counters, ionization chambers, and plastic scintillation detectors. The difference between radioactive calibration source 110 being used as a beta source and a gamma source is given the much higher self-absorption associated with beta radiation. 50 milligrams/square centimeter corresponds to a thickness or layer of Lutetium oxide compound of about 0.1 millimeters.

Although parameters vary depending on the application, one embodiment herein includes a radioactive calibration source 110 having a surface area of between about fifteen and one thousand square centimeters. A thickness can vary from a few micrometers to several centimeters depending on the application. The radioactive calibration source 110 including radioactive Lutetium covers at least a portion of the detection surface of detector 115, and the Lutetium compound is limited to less than about fifty milligrams of Lutetium compound per square centimeter of surface area. In such an embodiment, the Lutetium-compound can be dispersed over a flat area of around 15 to 1000 square centimeters in order to reduce or limit absorption of the beta radiation emitted by the radiation source 105 in the radioactive calibration source. A surface activity of up to approximately 2.5 Becquerels/square centimeter can be achieved in accordance with such design specification. This level of radiation activity is sufficient for testing and calibration of surface contamination detectors designed to alarm on for example 0.4 Becquerels/square centimeter.

In addition to a shroud-like cover (e.g., a cap), a Lutetium-based radioactive calibration source 110 according to embodiments herein can be formed into other shapes such as rods and/or tablets. Multiple Lutetium-based tablets can be used to fill a container of any shape. In one embodiment, tablet-shaped radioactive calibration sources of about 5 millimeters×5 millimeters×5 millimeters are loaded into a larger detector-shape container which can be positioned in close proximity to the radiation detection device for calibration purposes. In another embodiment, rods can be placed in proximity to (e.g., around a circumference of, in front of, etc.) detector 115 for purposes of calibrating radiation detection device 102. Spacing of the rods from one another enables radiation emitted from radiation source 105 and/or other rods to strike detector 115 without being absorbed.

In yet other embodiments, the radioactive calibration source 110 can be formed into a shape such as a disc or ring. A disc, similar in shape (but not necessarily similar in dimension) to a coin can be affixed to a surface detector 115 and provide enough radiation for calibration purposes. As discussed above, thickness of the disc can be controlled to limit absorption of radiation passing through the disc-shaped radioactive calibration source 110 to detector 115. In such an embodiment, the radioactive calibration source disc can include a knob, or screw, or other structure to permit it to be which firmly attached (e.g., temporarily or permanently attached) to a surface of the detector 115.

When formed as a ring, the radioactive calibration source 110 can be slid onto detector 115 like a ring on a finger. In such an embodiment, the open portion of the radioactive calibration source 110 does not absorb radiation and therefore prevent radiation emitted by radiation source 105 from striking detector 115.

A radioactive calibration source made from radioactive Lutetium-176 produces gamma energies of 90, 200, and 300 kilo-electron Volts. Such gamma energies are close to predominant spectral lines normally produced by so-called special nuclear materials such as U-235 and Pu-239 and their respective surrogates Co-57 and Ba-133, which have conventionally been used for calibration purposes. And since radioactive Lutetium-176 has a half-life of 37 billion years, its use in a radioactive calibration source provides a benefit that the radioactive calibration source essentially never needs to be replaced. Additionally, via exposure to a radioactive Lutetium calibration source 110, a radiation detection device 102 can be precisely calibrated or tuned to detect highly regulated material such as enriched Uranium and Plutonium. In other words, the radiation detection device 102 can utilize a calibration routine executed by processor 113 as an adjustment circuit to calibrate the radiation detection device to at least one of 90, 200, and 300 kilo-electron Volts known peak counts produced as a result of exposure to the radioactive calibration source 110. After calibration, the radiation detection device 102 can be used to identify peak counts of radiation at or around these energy values as well as in between or outside of a range of these energy values.

Detector 115 can include "inorganic" scintillation (i.e., radiation detection) material such as Thallium doped sodium iodide NaI(Tl) material. This type of material facilitates conversion of gamma energy into light energy. The detector 115 can be configured into a relatively compact form using this material. As previously discussed, the detector 115 operates to convert gamma energy into (visible or invisible) light energy. As an alternative to use of NaI(Tl) in detector 115, detector 115 can include other types of scintillation material such as Cesium Iodide (CsI) to convert gamma energy into photons.

Photo-detector 120 can include a photo-multiplier tube, which receives light emitted by detector 115 and electrically couples to the amplifier 120. In such an embodiment, the photo-multiplier tube operates to receive an optical signal from the detector 115 (e.g., as caused by interaction of radiation with the NaI(Tl) material of detector 115 as previously discussed), generate an electrical signal or electrical pulses proportional to the light signal (e.g., proportional to the intensity of the light signal), and transmit the output pulses to the amplifier 125. The amplifier 125, such as a linear amplifier, can be configured to adjust the pulse amplitude levels of respective output pulses to enable a discrimination of different pulse amplitude levels.

Processor 113 can include energy analysis circuitry such as comparators and counters. For example, in one embodiment, the radiation detection device (e.g., gamma radiation measuring instrument) utilizes one or more comparators, each having a given threshold, to achieve energy discrimination of the detected gamma radiation. Typical values correspond to gamma energies in ranges such as between 1 and 3000 kilo-electron Volts. Each comparator includes a corresponding counter (e.g., pulse counter).

Via respective counters, the processor 113 keeps track of the count rates for different threshold energy ranges. Additional details associated with measuring a level or levels of radiation and use of counters can be found in related U.S. patent application Ser. No. 11/076,409 filed on Mar. 8, 2005, entitled "PORTABLE RADIATION MONITOR METHODS AND APPARATUS," the entire teachings of which are incorporated herein by this reference.

Based on a determination of count levels, processor 113 can analyze levels of radiation emitted by radiation source 105 and provide an indication of the energy deviation ratio to a user and/or other devices. For example, in one arrangement as shown, processor 113 drives display screen 130 to provide an indication of a level of detected gamma radiation. In other embodiments, the processor 113 additionally or alternatively drives an audio device (e.g., a speaker), vibrator, LED, etc. to warn when a respective energy deviation ratio reaches a particular threshold value.

In one embodiment, the radiation detection device 102 is configured as a computerized device. For example, radiation detection device 102 includes processor 113. Memory 112 (e.g., a computer readable medium) and/or a respective repository stores an application, logic instructions and/or respective data that are executed or utilized by processor 113 to carry out calibration and radiation measurements according to techniques discussed herein.

Memory 112 can be of any type of volatile or non-volatile memory or, alternatively, storage system such as a computer memory (e.g., random access memory (RAM), read only memory (ROM), or another type of memory), disk memory, such as hard disk, floppy disk, optical disk, etc.

The processor 113 can be any type of circuitry or processing device such as a central processing unit, computer, controller, application specific integrated circuit, programmable gate array, or other circuitry that can access the radiation measuring application encoded within the memory 112 in order to run, execute, interpret, operate, or otherwise perform the radiation measuring application logic instructions. In other words, in one embodiment, processor 113 executes an application stored in memory 112 to carry out techniques as discussed herein.

Figure 2A:
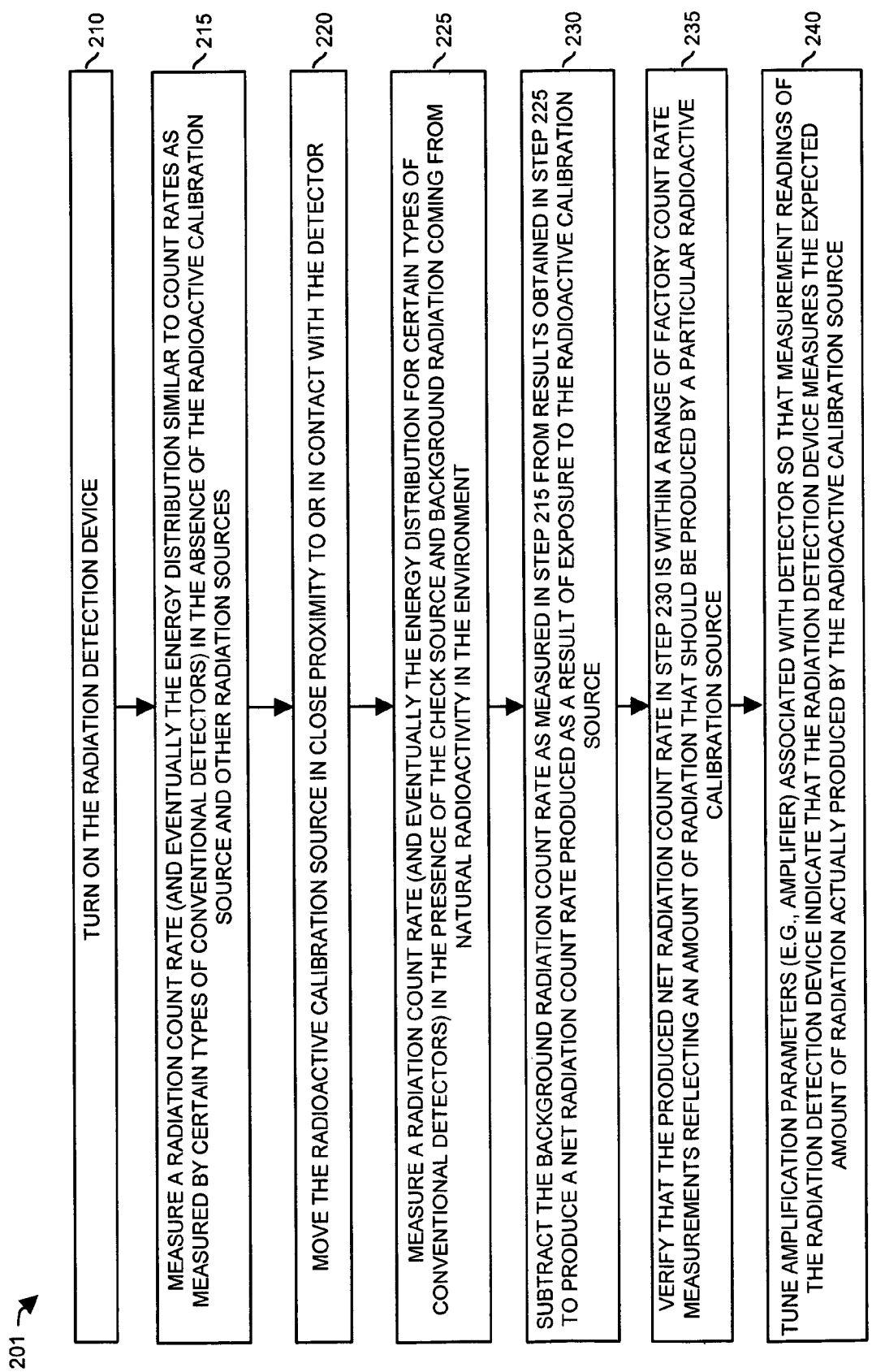
FIG. 2A is a flow chart illustrating calibration and usage of a radiation detection device according to embodiments herein.

FIG. 2A is a flow chart 201 illustrating calibration of a radiation detection device 102 using a radioactive calibration source 110 according to embodiments herein. More specifically, flowchart 201 illustrates a technique of verifying performance of radiation detection device 102 in the presence of a radioactive calibration source 110 that is temporarily attached to detector 115. Note that additional details associated with this technique are discussed with respect to FIGS. 4 and 5.

In step 210 of FIG. 2A, the user turns on the radiation detection device 102.

In step 215, the radiation detection device 102 measures a radiation count rate (and eventually an energy distribution, similar to count rates as measured by certain types of conventional detectors) in the absence of the radioactive calibration source 110 and radiation source 105. Thus, radiation detection device 102 measures only naturally occurring background radiation present in the surrounding environment.

In step 220, the user moves the radioactive calibration source 110 in close proximity to or in contact with the detector 115 of radiation detection device 102.

In step 225, the radiation detection device 102 measures a radiation count rate (and eventually the energy distribution, as is done for certain types of conventional detectors) in the presence of the check source 110 and background radiation coming from natural radioactivity in the environment.

In step 230, the radiation detection device 102 subtracts the background radiation count rate as measured in step 215 from results obtained in step 225 to produce a net radiation count rate produced as a result of exposure to the radioactive calibration source 110.

In step 235, the radiation detection device 102 verifies that the produced net radiation count rate in step 230 is within a range of factory count rate measurements reflecting an amount of radiation that should be produced by a particular radioactive calibration source 110.

In step 240, the user tunes the amplification parameters (e.g., amplifier 125) associated with detector 115 so that i) measurement readings of the radiation detection device 102 indicate that the radiation detection device 102 (when the radioactive calibration source 110 is in close proximity to detector 115) measures the expected amount of radiation actually produced by the radioactive calibration source 110 and ii) future measurements of radiation from radiation source 105 are accurate.

Figure 2B:
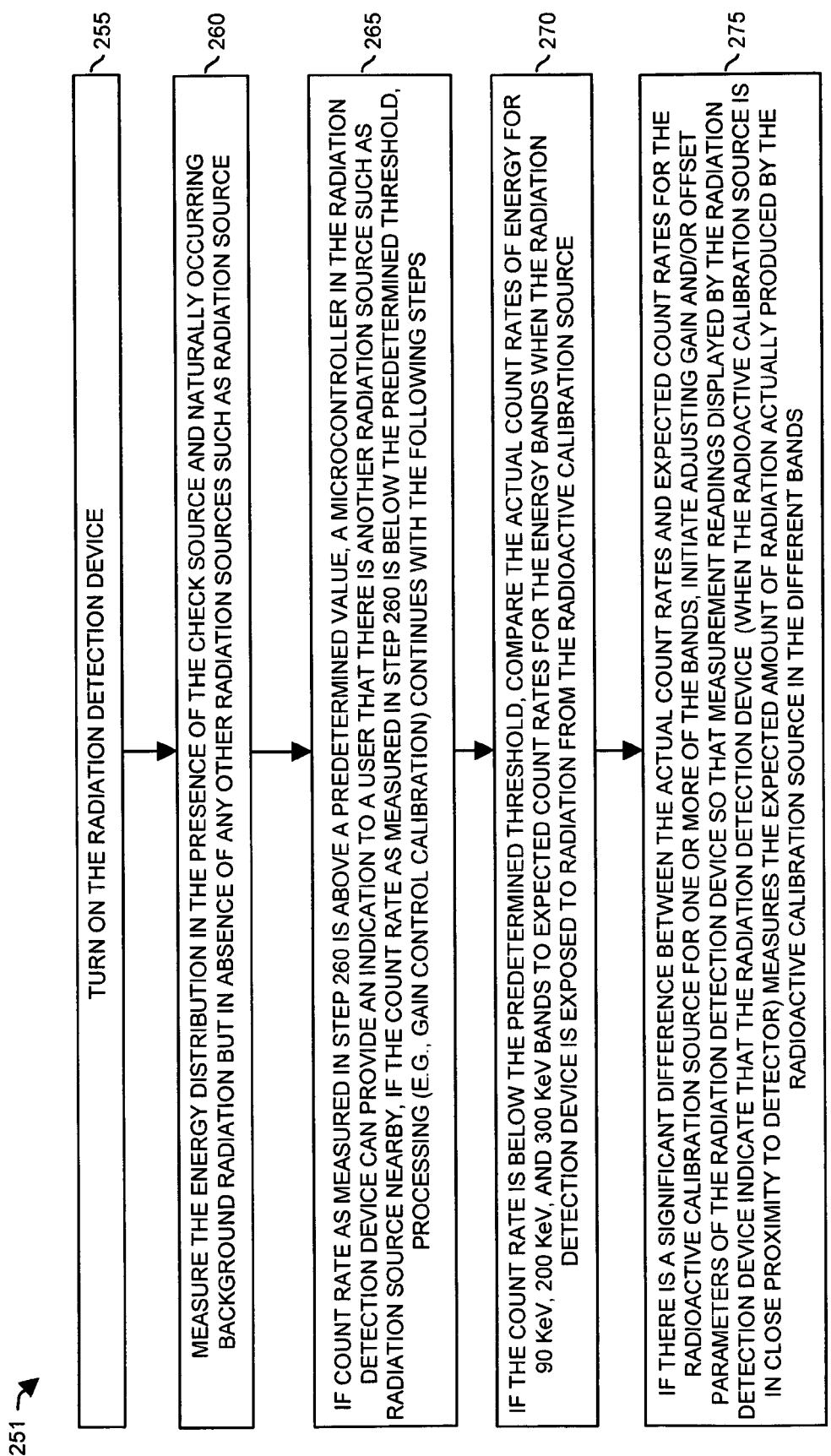
FIG. 2B is a flow chart illustrating calibration and usage of a radiation detection device according to embodiments herein.

FIG. 2B is a flow chart 251 illustrating performance verification and gain control when radioactive calibration source 110 is permanently secured in close proximity to detector 115 according to embodiments herein. Note that additional details associated with this technique are discussed with respect to FIG. 6.

In step 255 of FIG. 2B, the user turns on the radiation detection device 102.

In step 260, the radiation detection device 102 measures the energy distribution detected by detector 115 in the presence of the check source 110 and naturally occurring background radiation but in absence of any other radiation sources such as radiation source 105.

In step 265, if a count rate as measured in step 260 is above a predetermined value (e.g., threshold), a microcontroller in the radiation detection device can provide an indication to a user that there is another radiation source such as radiation source 105 nearby. This alerts the user not to continue with the gain control in the following steps, and that the user must repeat steps 255 and 260 in the absence of such interfering radiation sources. In another embodiment, the gain stabilization is performed fully or automatically on a periodic basis and the microcontroller inhibits the gain control by itself. If the count rate as measured in step 260 is below the predetermined threshold, processing (e.g., gain control calibration) continues with the following steps.

In step 275, if the count rate is below the predetermined threshold, the radiation detection device 102 compares the actual count rates of energy for 90 kilo-electron Volts, 200 kilo-electron Volts, and 300 kilo-electron Volts bands to expected count rates for the energy bands when the radiation detection device 102 is exposed to radiation from the radioactive calibration source 110.

In step 280, if there is a significant difference between the actual count rates and expected count rates for the radioactive calibration source 110 for one or more of the bands, then the user (or microcontroller associated with the radiation detection device 102) initiates adjusting gain and/or offset parameters of the radiation detection device 102 so that i) measurement readings displayed by the radiation detection device 102 indicate that the radiation detection device 102 (when the radioactive calibration source 110 is in close proximity to detector 115) measures the expected amount of radiation actually produced by the radioactive calibration source 110 in the different bands and ii) that future measurements of radiation from radiation source 105 are accurate.

Figure 3:
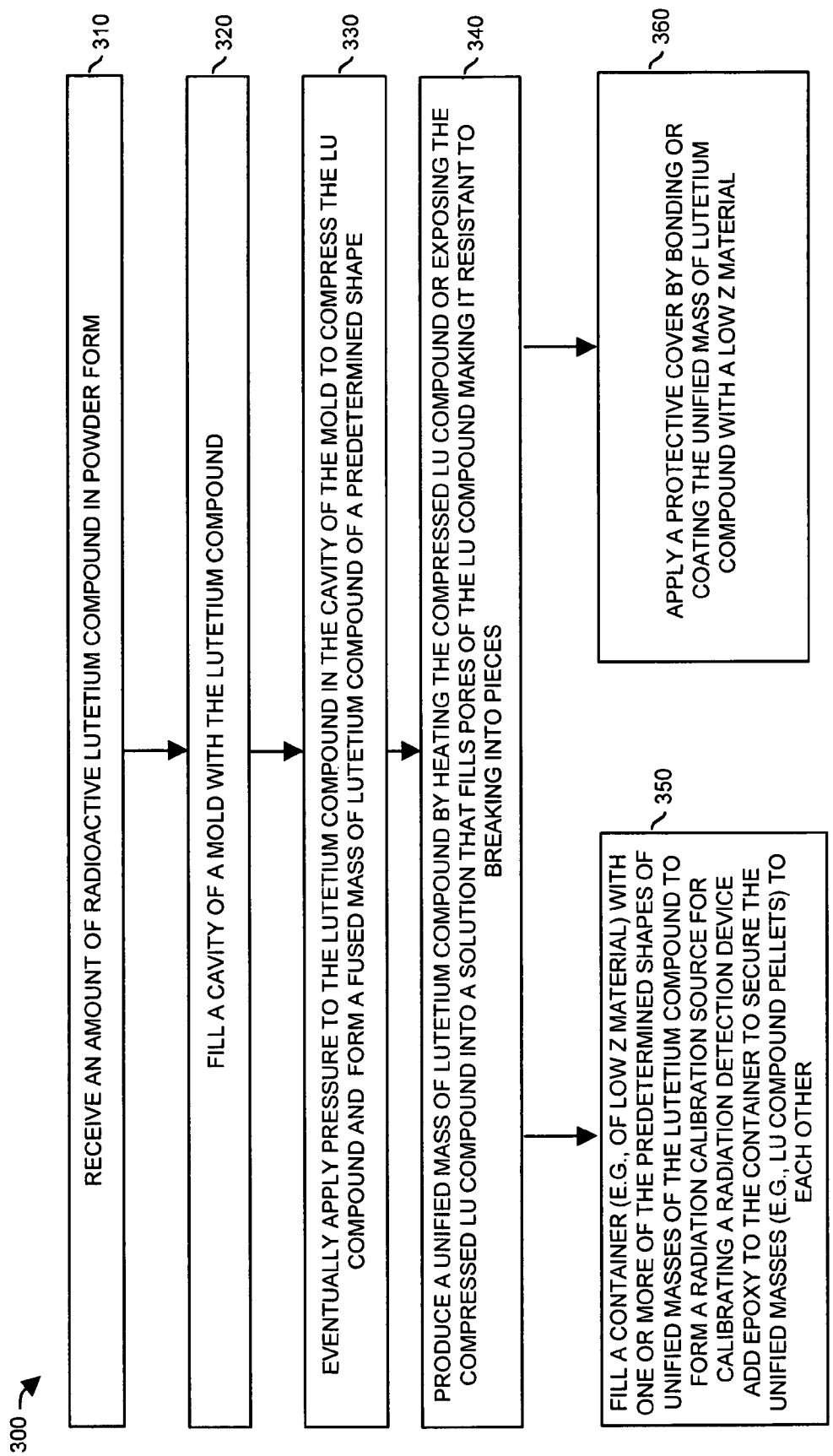
FIG. 3 is a flow chart illustrating production of a radioactive calibration source according to embodiments herein.

FIG. 3 is a flow chart illustrating production of a radioactive calibration source according to embodiments herein.

In step 310, a manufacturing facility receives an amount of radioactive lutetium compound in powder, granule, particulate, or pulverized form. Typically, the Lutetium compound used to create a radioactive calibration source 110 has a purity between 90 and 99.99 percent by volume or weight. Other percentage of purities can be used for cost saving purposes or when there is limited availability of the base material. Lutetium compound can be obtained from sources such as Stanford Materials Corporation, American Elements, METALL RARE EARTH LIMITED, Auer-Remy GmbH, and Chem-Pur GmbH.

In sub step 320, the manufacturing facility fills a cavity of a mold with the Lutetium compound powder.

In step 330, the manufacturing facility applies pressure (via a device such as a piston) to the Lutetium compound in the cavity of the mold to form a compressed compact mass (e.g., fused mass) of Lutetium compound of a predetermined shape. Applying pressure to the amount of Lutetium compound in the cavity change a density of the Lutetium compound from a first density to a second density. For example, the density of the Lutetium compound before applying pressure can be about 1.5 grams per cubic centimeter. The density of the Lutetium compound after applying a high pressure (e.g., typically >100 MegaPascal) can be about 5.0 grams per cubic centimeter up to the theoretical limit of 9.4 grams per cubic centimeter for a Lutetium oxide compound. Based on application of the pressure in the cavity of the mold, the manufacturing facility forms the Lutetium compound into a calibration source (e.g., pellets or other described shapes) for calibrating a radiation detection device. The compressed or fused Lutetium material produced according to the steps 310, 320, 330 may not yet possess sufficient mechanical stability for further handling. Again, note that the term "fused mass" reflects a compressed state of the Lutetium compound in which the Lutetium compound is able to retain its shape without application of outside forces. For example, in the absence of walls of the mold to retain its shape, the compressed Lutetium compound may crumble and easily fall apart when handled. It is therefore advantageous to transform the material into a more stable form.

One embodiment involves converting the powdered form of Lutetium compound into a unified, or coherent mass via mixing the Lutetium compound with a stabilizing material such as epoxy or performing additional processing steps. For example, in step 340, the manufacturing facility further processes the compressed Lutetium compound into a unified mass of Lutetium compound (e.g., a form in which the compressed Lutetium compound is resistant to breaking apart) by heating the compressed Lutetium compound to a temperature of greater than 500° C. This sinters the Lutetium compound. The step of sintering causes the powder to form a unified mass (i.e., ceramic) by heating without melting. Also as previously discussed, the manufacturing facility can (as an alternative or in addition to sintering) expose the compressed Lutetium compound to a solution (e.g., plastic) that fills pores of the mass of compressed Lutetium compound to make it more resistant to crumbling and falling apart after the solution hardens.

Further processing to form a radioactive calibration source 110 according to embodiments herein can continue at step 350 and/or 360. For example, in step 350, the manufacturing facility fills a container with the unified masses of Lutetium compound (e.g., pelletized versions of the Lutetium compound resistant to breaking apart) in a shape such as a tablet or pelletized form. The container can be many times larger than a size of a single unified mass of Lutetium compound pellets that fill the container. Epoxy or similar material can be added to the container of pellets to secure the pellets to each other in order to avoid movement of the "pelletized" Lutetium compound material in the container.

In step 360, in lieu of or in addition to step 350 of creating a radioactive calibration source 110 based on a container of tablets or pellets created from the powder Lutetium compound, the manufacturing facility can apply a protective coating (e.g., outer shell or coating) to a radioactive calibration source 110 (e.g., pellets or other forms) such as those shown in FIGS. 6-9. Accordingly, one embodiment herein includes production of check sources (e.g., a planar shaped check source) containing natural Lutetium for testing of plane large area plastic detectors. Unlike a corresponding small size of conventional gamma check sources containing only a few micrograms of radioactive material enclosed in a holder of the size and shape of a small coin (e.g., disk), radioactive calibration source 110 according to embodiments herein must be adapted to the size of the detector in order to achieve a sufficient net radiation signal versus the natural background to calibrate the detector.

Note again that the radioactive calibration source can be made into a predefined shape that can be integrated into detector 115 (e.g., a scintillator) of a radiation detector device as in FIG. 1. As discussed above, the detector 115 enables conversion of gamma radiation into photon energy.

A typical surface area of radioactive calibration source 110 for at least partially flat-shaped detectors is up to about 90% of the detector surface. In such an embodiment, a mass per unit surface area of radioactive calibration source 110 should not exceed approximately 5 grams/square centimeter, which corresponds to 250 Becquerels/square centimeter in order to avoid self absorption of the gamma radiation in the Lutetium compound. Accordingly, one embodiment herein includes forming at least one surface area of the radioactive calibration source to have less than five grams of radioactive Lutetium compound per square centimeter.

This limited mass per unit surface area prevents significant self-absorption in the radioactive calibration source 110 itself. For plane large area detectors, even a low density Lu-compound can be used, since the detection efficiency is not highly dependent on distance is small compared to the dimensions of the large area detector.

As discussed above, the radioactive calibration sources (i.e., check sources) containing natural Lutetium can have a geometry adapted to the size and shape of high sensitive gamma detectors. Depending on the embodiment, a typical volume of the radioactive calibration source 110 can be in a range from about 5-50 cubic centimeters of Lutetium compound. Assuming an achievable density of about 5 grams/cubic centimeters of a compressed Lu salt, an amount of natural Lutetium for use in a radioactive calibration source would be on an order of 25 to 250 grams. Such a volume would yield a radiation activity value on the order of 1 to 10 kBecquerels.

Rod-like sources containing natural Lutetium (typical volume of 5-500 cubic centimeters, 25-2500 g natural Lutetium) compound can be inserted into detector chambers and detector arrays of a radiation detection device 102. Since the gamma radiation from radioactive calibration source 110 is coincident within 1 nanosecond, coincidence types of monitors (Patent document EP 1 131 653) also can be tested via use of radioactive calibration source 110. For coincidence monitoring, the self-attenuation of gamma rays is especially important, since it enters via both factors into the product of the detection probabilities of both gammas. That means, as an example, if the first gamma is attenuated by 50% and the other gamma by 50% as well, the gross number of detected gammas is attenuated by 50% while the coincidence rate is attenuated by 75%. Thus, in such an embodiment, the specific weight of the Lutetium filling desirable should not exceed 1 gram per each centimeter of length of the rod. In case the corresponding activity associated with a single rod is insufficient for calibrating a radiation detection device 102, an array of multiple Lutetium rods can be used for calibration purposes. In such an embodiment, these rods can be sufficiently spaced from each other to minimize absorption by a rod of the gamma rays originating from a neighboring rod.

As previously discussed, embodiments herein can include use of a natural Lu-compound for economical reasons. Thus, although possible, it is far less desirable to use metallic Lutetium (in its pure metallic form) to produce radioactive calibration source 110, since this would be quite expensive. Furthermore, Lutetium metal or metal powder is very reactive in the presence of oxygen, and would require special safety measures (i.e., handling under inert gas atmosphere), in order for Lutetium in pure metallic form to be used in producing check sources.

One embodiment herein includes increasing the density of Lu-oxide or other Lutetium salts from normal density (of as purchased powder) of about 1.5 grams/cubic centimeter up to the theoretical maximum of 9.4 grams/cubic centimeter (for $Lu_2O_3$) by applying high pressure via device such as a compaction tool. This more dense form of Lutetium-oxide (when so compressed) can then be used to form radioactive calibration source as discussed above but with a lesser volume of material to achieve the same result. In addition to or in lieu of utilizing a low-Z material to encase the Lu compound and thus prevent damage to the source, compressed and/or non-compressed Lu-oxide (powder) can be mixed with liquid epoxy, which eventually sets into a desired form as discussed herein.

Figure 4:
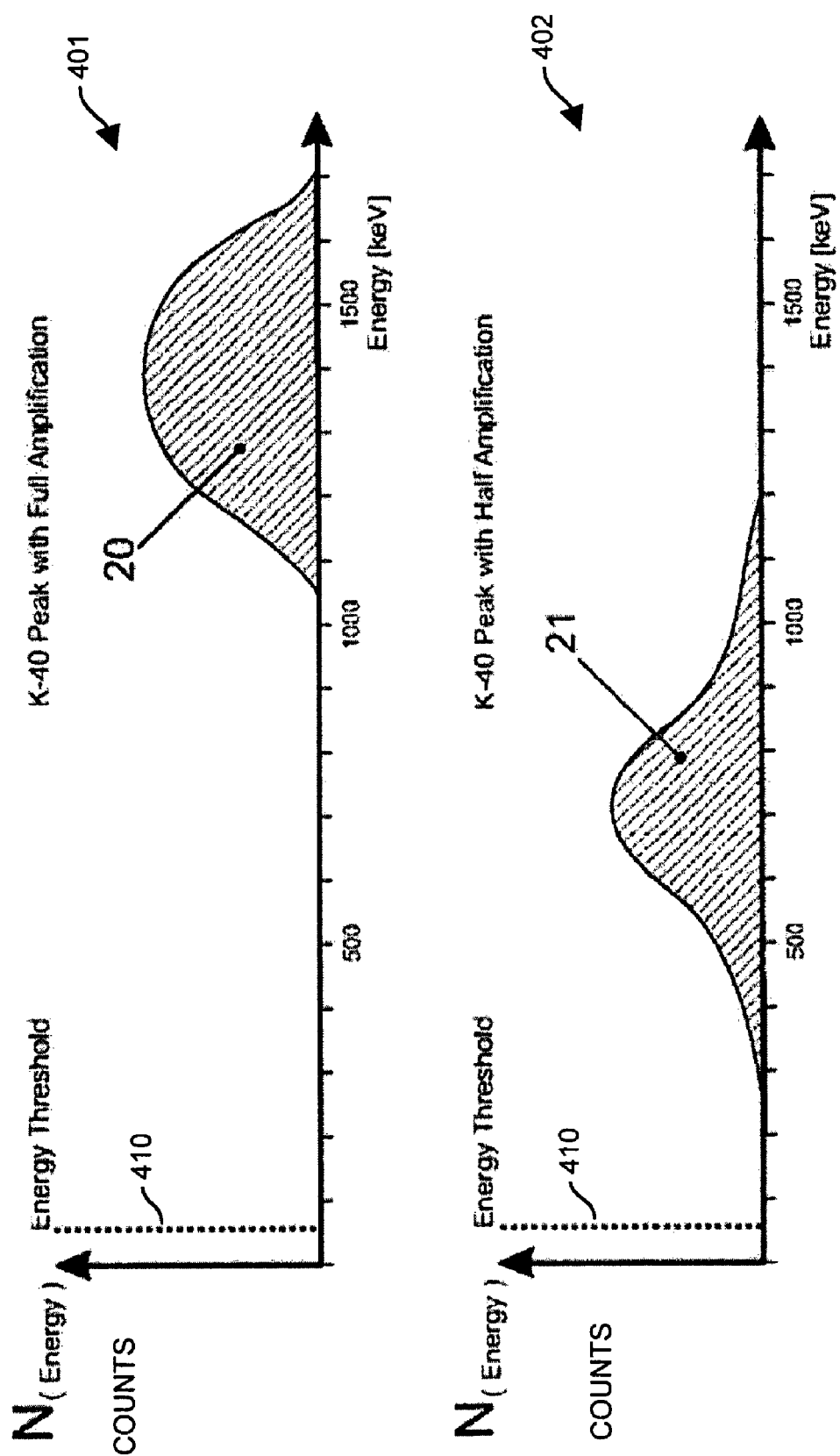
FIG. 4 is a graph illustrating a hypothetical example of calibrating a radiation detection device via use of K-40.

FIG. 4 is a hypothetical example illustrating the difficulty of detecting of fading of a radiation detector using a conventional K-40 calibration source. In general, the graphs (e.g., graph 401 and graph 402) show the measured distribution of detected events N as a function of the gamma energy for a detector (e.g., a large area plastic scintillator which is used in an airport gate monitor) with limited energy resolution.

More particularly, graph 401 shows (as an example) a distribution of counts (e.g., count region 20) based on exposure of a radiation detection device to a known natural gamma radiation source K-40 with a gamma energy of 1460 kilo-electron Volts. This peak is far above an energy threshold 410, so that the count rate of all events above this threshold 410 is very insensitive to the amplification of the detector. Note that in graph 402, where the amplification of the detector (as a result of drifting) is significantly reduced, all events are still above the threshold 410, and hence the fading condition of the detector cannot be detected by measuring the total count rate. Fading of more than 5-10% is enough reason to apply a corrective action such as recalibrate the radiation detection device 102 in accordance with techniques discussed above.

Figure 5:
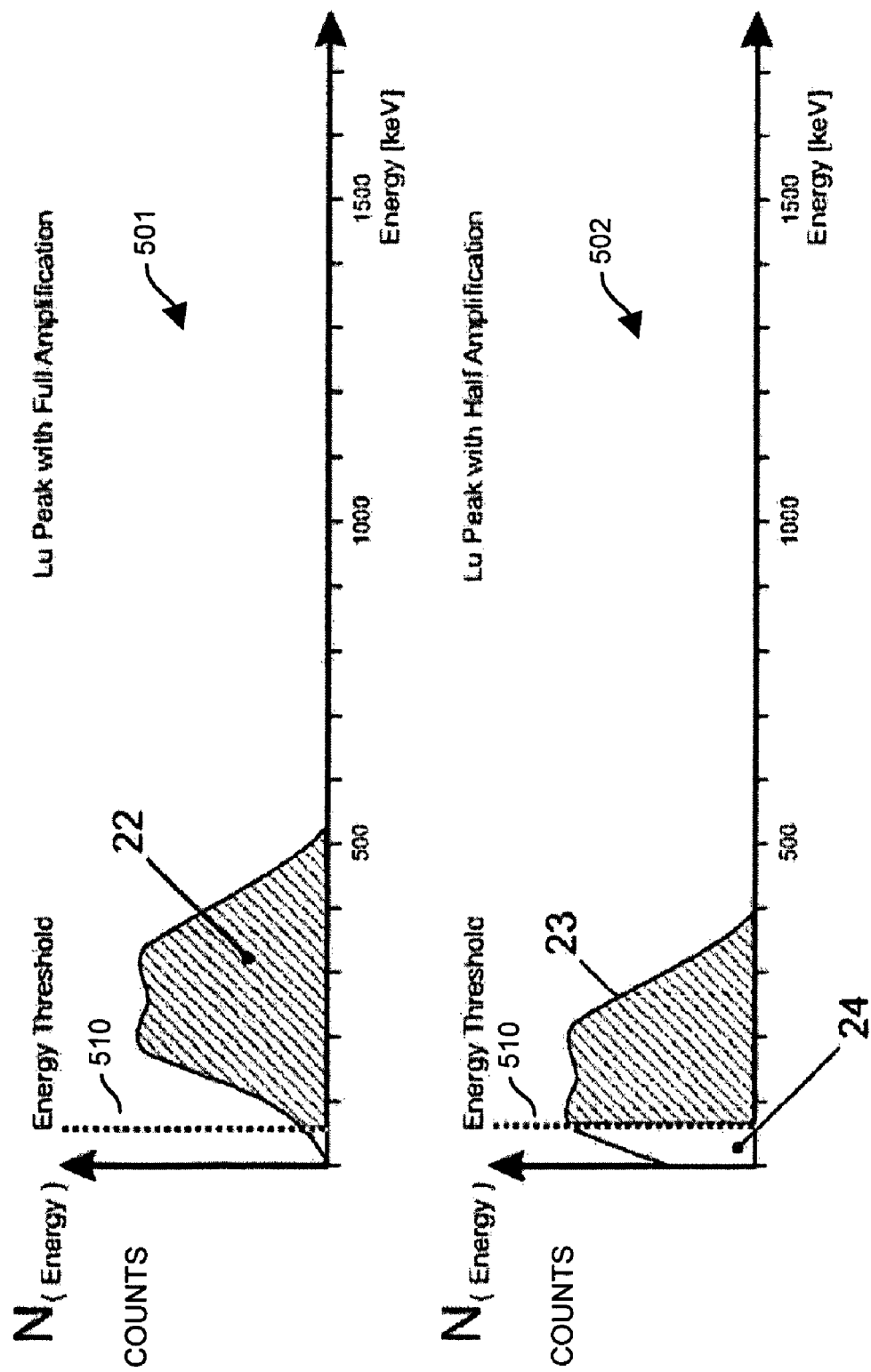
FIG. 5 is a graph illustrating a hypothetical example of calibrating a radiation detection device according to embodiments herein.

FIG. 5 is a hypothetical example illustrating the detection of fading of a detector below a respective threshold value based on use of a Lutetium compound as a calibration source. Graph 501 illustrates calibration of a radiation detection device at 200 kilo-electron Volts and 300 kilo-electron Volts gamma energies based on Lutetium as a calibration source. Note that nearly all events fall into the region above the energy threshold and contribute to the detector count rate represented by region 22.

Graph 502 illustrates fading of the radiation detector. In this example, the radiation detection device continues to measure a Lutetium-based calibration source, and graph 502 illustrates that a significant part of all events falls into region 24 below the energy threshold 510. A detected portion of counts above threshold 510 appears in region 23. The counts in region 24 are not useful for measurement purposes because they fall below threshold 510. However, a comparison of the counts in region 23 with the counts in region 22, i.e., the counts taken by a previous measurement under the same test conditions (i.e., measuring time and position of the Lutetium check source with respect to the detector), permits the fading of the detector amplification to become immediately apparent even to the unskilled user.

Figure 6:
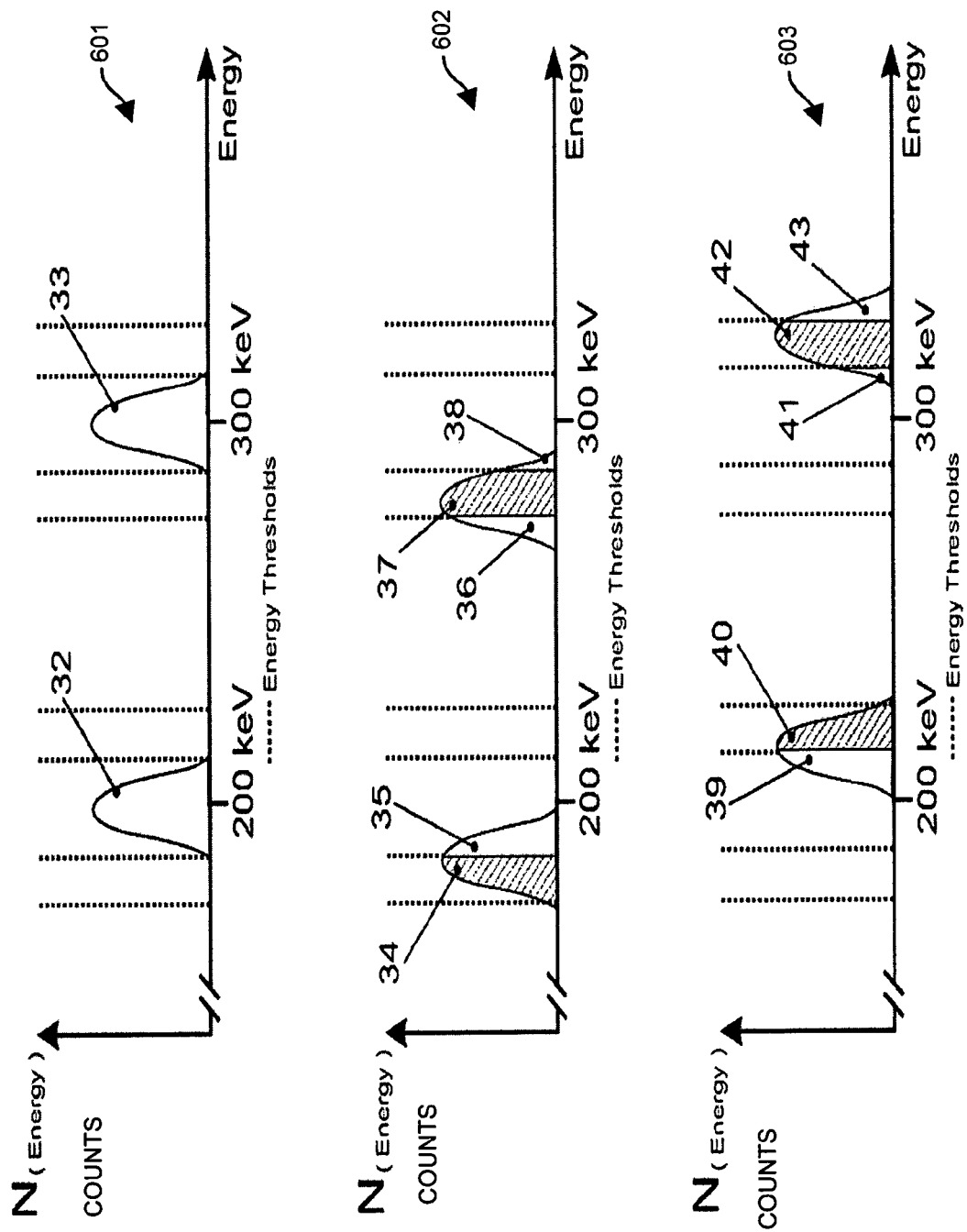
FIG. 6 is a graph illustrating results of calibrating a radiation detection device according to embodiments herein.

FIG. 6 is a diagram illustrating a hypothetical example of applying permanent gain controlling to a radiation detection device for higher resolution detection.

In graph 601, upon exposure to a Lutetium calibration source, a radiation detection device is calibrated (e.g., via amplification adjustments and/or electronic tuning of the voltage thresholds) so that region 32 is centered (e.g., in a respective energy window) around the 200 kilo-electron Volts energy level produced by the Lutetium calibration source. Additionally, region 33 is centered (e.g., in an energy window) around the 300 kilo-electron Volts energy level produced by the Lutetium calibration source.

In graph 602, detector amplification is slightly reduced so that the counts in region 34 and region 37 fall outside window regions centered around 200 kilo-electron Volts and 300 kilo-electron Volts respectively. Region 35 and region 38 display counts falling in a peak window region. Region 36 indicates counts falling far outside of a center window (e.g., 300 kilo-electron Volts) as a result of drifting or fading. To correct for this drift or fade, the amplification of the radiation detection device needs to be increased by adjusting an amplification level of amplifier 125. In one embodiment, this involves tuning attributes of the photodetector 115 (e.g., a photomultiplier) or increasing the electronic amplification of amplifier 125.

In graph 603, detector amplification is higher than desired, and a significant number of events 40 and 42 fall into the right reference windows at higher energy levels than 200 kilo-electron Volts and 300 kilo-electron Volts respectively. In this case the amplification of the detector needs to be decreased (e.g. by tuning the high voltage of the photomultiplier of a scintillation detector or by decreasing the electronic amplification of an amplifier circuitry).

Compared to the known technology of using single line gamma sources (Cs-137 or K-40), the stabilization via the spectral energies produced by Lutetium is more dependable (during exposure to background radiation) since the expected ratio of the counts 32 and 33 is known and comparison with measured ratios enables an additional verification of the proper amplification settings.

Also, via calibration of a radiation detection device 102 to 90, 200, and/or 300 kilo-electron Volts using a Lutetium calibration source as discussed above, a radiation detection device 102 can be (periodically, occasionally, repeatedly, etc.) calibrated to correct for "fading" or "drifting" out of specification due to environmental factors such as temperature changes. In other words, detector 115 can be a scintillator device having characteristics that vary based on temperature or other factors. In one embodiment, a radiation detection device includes a common inorganic scintillation detector such as one made from NaI(Tl) as previously discussed. Such a detector can exhibit significant drift effects as a result of temperature changes, aging, and exposure to elements. Adjustments to amplification enable the radiation detection device 102 to be precisely calibrated for detecting energy profiles of unknown radiation sources. In other words, after calibration to provide correct gain of amplifier 125 (FIG. 1) and/or drifting effects associated with detector 115 as a result of temperature changes, the radiation detection device 102 can be used to more accurately measure "signatures" (e.g., energy patterns) of unknown materials for purposes of material identification.

Figure 7:
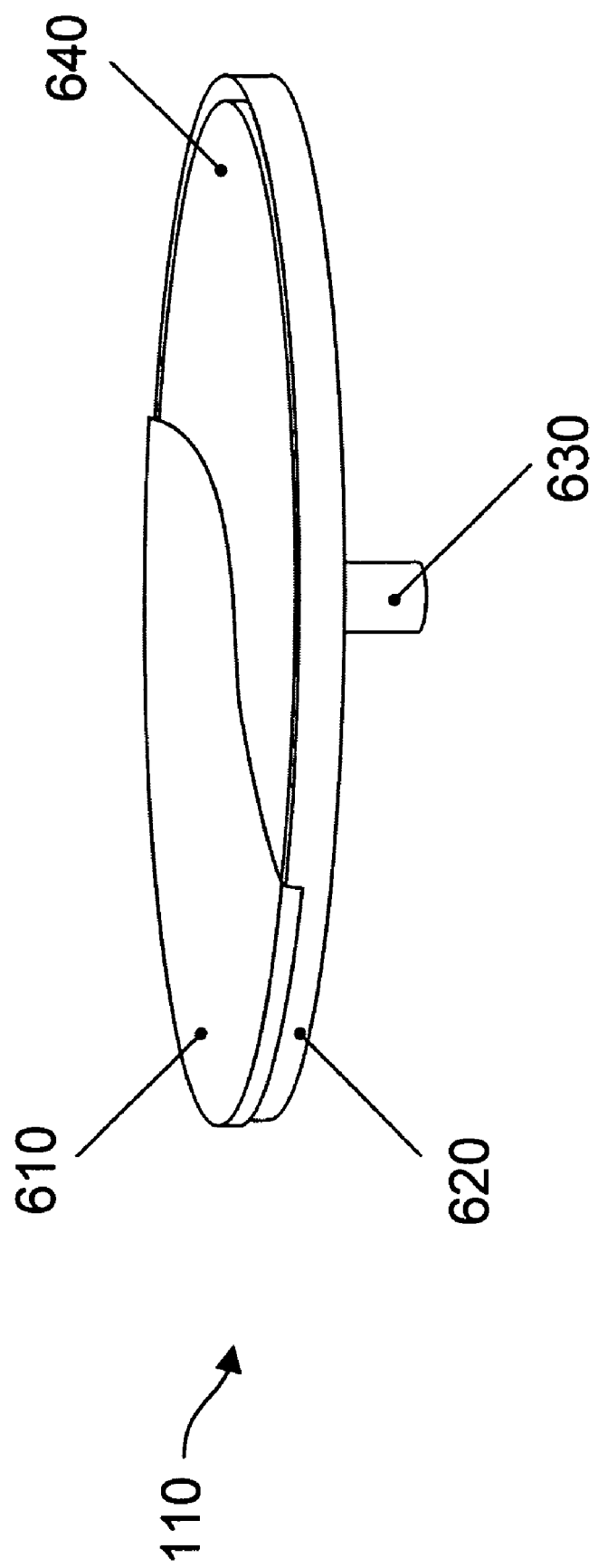
FIG. 7 is a diagram of a radioactive calibration source in the form of a disk according to embodiments herein.

FIG. 7 is a diagram of a radioactive calibration source 110 in the form of a disk 640 according to embodiments herein. As shown, the radioactive calibration source 110 includes a disk 640 of Lutetium compound formed, for example, using techniques discussed above such as application of pressure and/or fusing of powdered Lutetium compound into a coherent or unified mass (via a bonding material or heating), etc. Disk 640 is encased with a combination of protective coating 620 and protective coating 610, each of which are made from a low Z material (e.g., plastic, aluminum, etc.) as discussed above. Thus, even if the disk 640 of Lutetium compound were not formed into a unified compressed mass, the Lutetium compound (e.g., a powdered form) would be protected from damage by such an encasing. Stem 630 (e.g., bracket) enables the radioactive calibration source 110 to be mounted or secured to radiation detection device 102.

Figure 8:
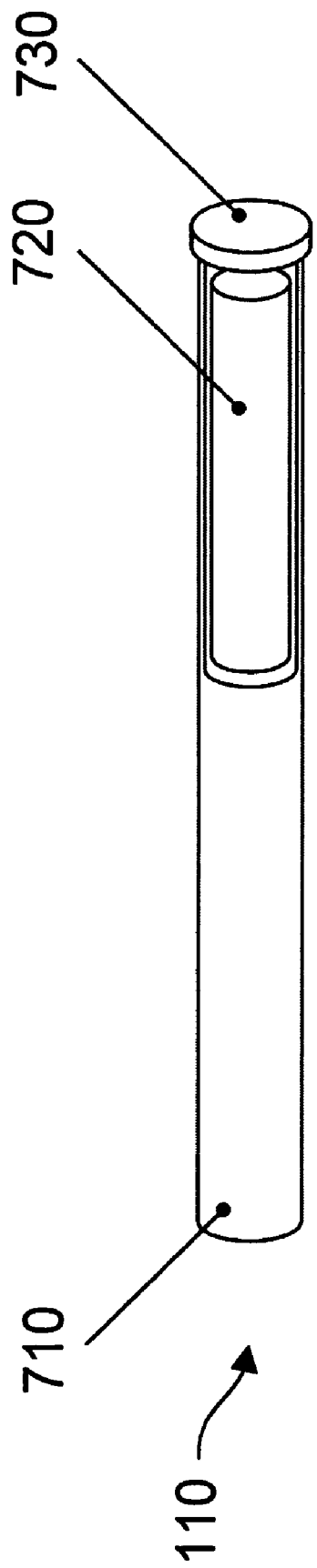
FIG. 8 is a diagram of a radioactive calibration source in the form of a rod according to embodiments herein.

FIG. 8 is a diagram of a radioactive calibration source 110 in the form of a rod 720 according to embodiments herein. As shown, the radioactive calibration source 110 includes rod 720 of Lutetium compound formed as discussed above based on application of pressure and/or fusing of powdered Lutetium compound into a coherent or unified mass (via a bonding material or heating). Rod 720 is encased with a combination of protective coating 710 and protective coating 730 made from a low Z material (e.g., plastic, aluminum, etc.) as discussed above. Thus, even if the rod 720 of Lutetium compound were not formed into a unified mass, the Lutetium compound (e.g., not converted from a powdered form) would be protected from damage by such an encasing.

Figure 9:
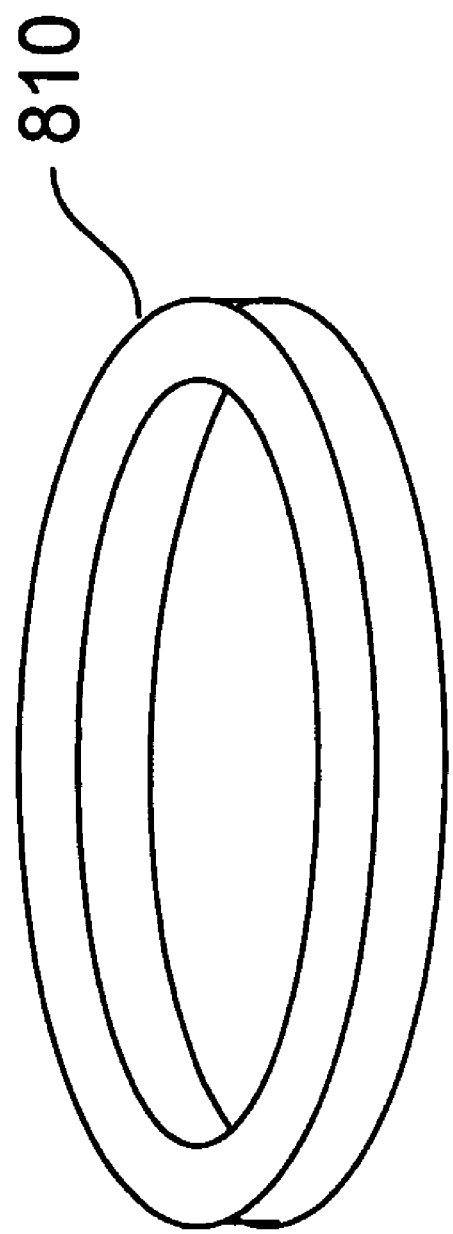
FIG. 9 is a diagram of a radioactive calibration source in the form of a ring according to embodiments herein.

FIG. 9 is a diagram of a radioactive calibration source 110 in the form of a ring 810 according to embodiments herein. As shown, the radioactive calibration source 110 is formed into a ring 810 of Lutetium compound. As previously discussed, the ring 810 can be formed based on application of pressure and/or fusing of powdered Lutetium compound into a coherent or unified mass (via a bonding material or heating). Similar to other embodiments as discussed herein, ring 810 can be coated or encased with low Z material.

Figure 10:
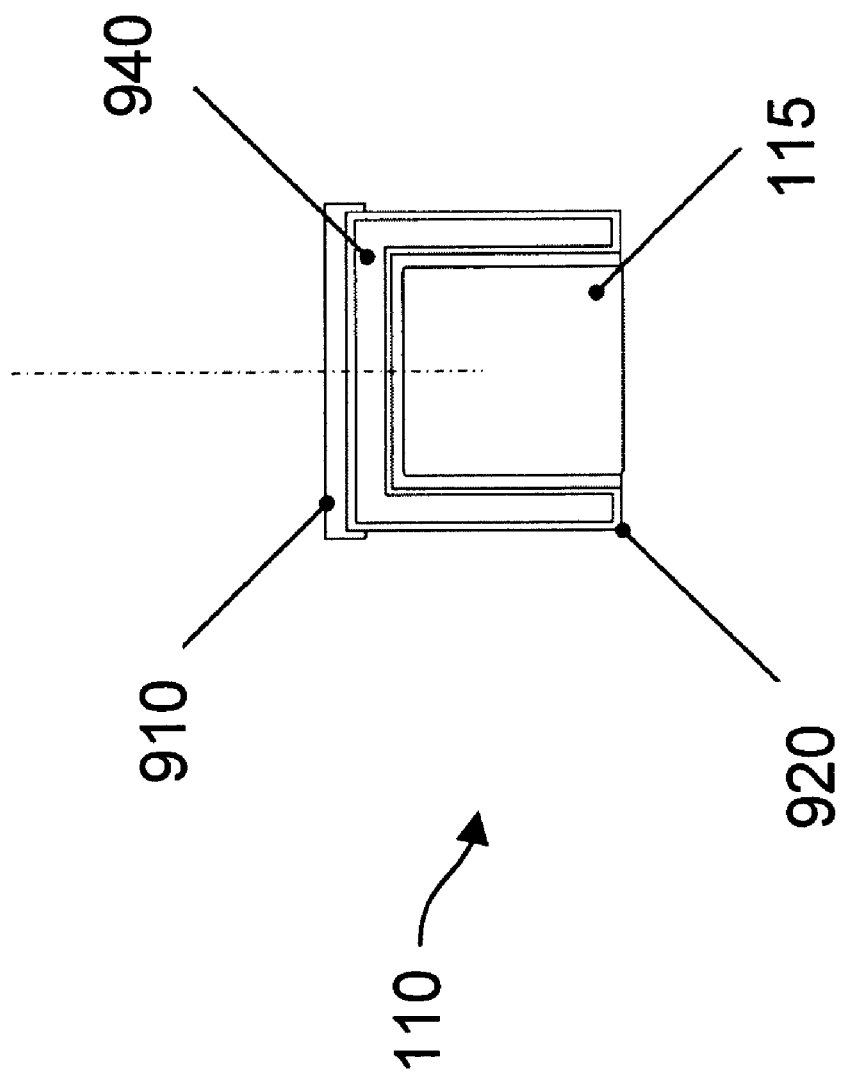
FIG. 10 is a diagram of a radioactive calibration source in the form of a shroud according to embodiments herein.

FIG. 10 is a diagram of a cross section of a radioactive calibration source 110 in the form of a shroud 940 according to embodiments herein. The shroud 940 of Lutetium compound is encased with protective covering 910 and protective covering 920 to protect against damage. As shown, the radioactive calibration source 110 including shroud 940, protective covering 910, and protective covering 920, at least partially encases detector 115 of radiation detection device 102 (additional details shown in FIG. 1).

Figure 11:
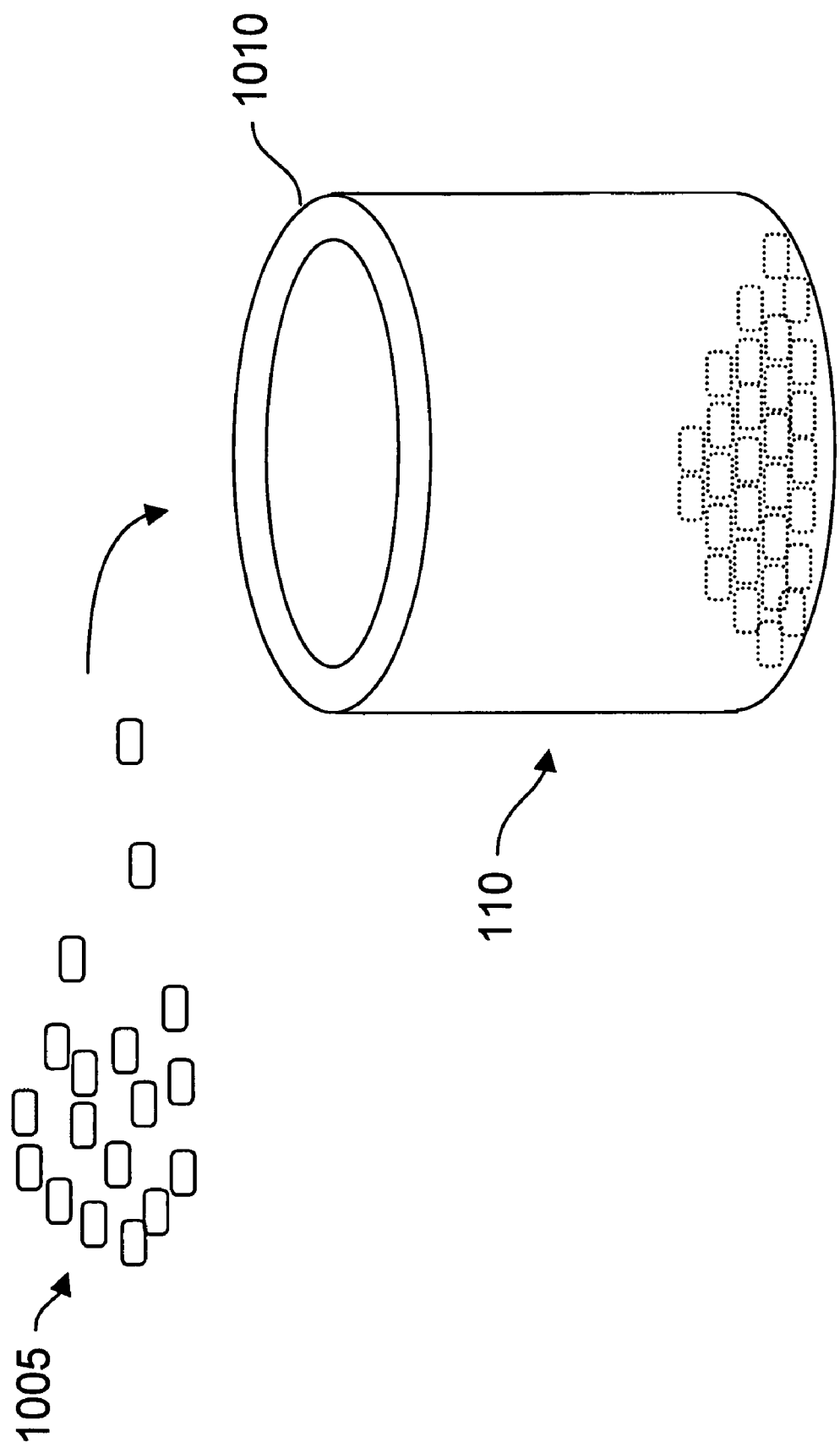
FIG. 11 is a diagram of a radioactive calibration source in the form of a container including multiple pellets according to embodiments herein.

FIG. 11 is a diagram of a radioactive calibration source 110 in the form of a container 1010 filled with pellets of (compressed or uncompressed) Lutetium compound according to embodiments herein. For example, pellets 1005 (or tablets, cubes, balls, etc.) at least partially made from Lutetium compound based on techniques as discussed above fill container 1010. Container 1010 can be made from a low Z material so that radiation generated by pellets passes through the container to a radiation detection device 102 for calibrating the radiation detection device 102.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method comprising:
   receiving an amount of material in powder form, the material including Lu-176;
   filling a cavity of a mold with the material;
   applying pressure to the material in the cavity of the mold to form a fused mass of material including Lu-176; and
   forming the fused mass to be a radiation source that is movable with respect to a radiation detector, the fused mass including the Lu-176 to produce radiation to calibrate the radiation detector;
   wherein the radiation detector is a gamma radiation detector, the method further comprising:

forming the fused mass to perform calibration of the gamma radiation detector at one or more peak count values between around 90 and 300 kilo-electron volts.

2. A method as in claim 1 further comprising:
forming at least a portion of the fused mass into a shroud-like structure for encasing multiple surfaces of a radiation detection element of a radiation detection device.

3. A method as in claim 1 further comprising:
forming at least one surface area of the fused mass to have a thickness in which the fused mass of material including the Lu-176 has a weight to surface area of less than five grams per square centimeter.

4. A method as in claim 3 further comprising:
forming the fused mass into a ring.

5. A method as in claim 1 further comprising:
forming the fused mass into a rod.

6. A method as in claim 1 further comprising:
forming the fused mass into a disk.

7. A method as in claim 1 further comprising:
forming at least a portion of the fused mass to encapsulate a portion of the radiation detector.

8. A method as in claim 1 further comprising:
forming the fused mass as being attachable and removable with respect to the radiation detector.

9. A method as in claim 8 further comprising:
forming the fused mass as being attachable to the radiation detector; and
coating the fused mass with a low radiation absorbing protective material enabling the radiation from the source to pass through the coated fused mass to the radiation detector.

10. A method as in claim 1 further comprising:
forming the fused mass to include at least one surface area shaped to match a corresponding at least one surface area of the radiation detector to removably attach the fused mass to the radiation detector.

11. A method as in claim 1 further comprising:
forming the fused mass to include at least one surface area for passing of radiation through the fused mass to the radiation detector.

12. A method as in claim 1 further comprising:
coating the fused mass with a low radiation absorbing protective material enabling radiation from a source other than the fused mass to pass through the coated fused mass to the radiation detector.

13. A method comprising:
receiving an amount of material in powder form, the material including Lutetium-176;
applying pressure to the material to change a density of the material from a first density to a second density, the second density being greater than the first density; and
forming the received amount of material into a unified mass as being movable with respect to a radiation detector, the unified mass including the Lu-176 to produce radiation to calibrate the radiation detector;
wherein receiving the amount of material includes receiving an amount of Lutetium compound and wherein applying pressure to the material includes compressing the Lutetium compound, the method further comprising:
producing the unified mass by exposing the compressed Lutetium compound to a solution that fills pores of the compressed Lutetium compound and makes the compressed Lutetium compound resistant to breaking into pieces;
filling a container made from low Z material with the unified mass of Lutetium compound along with other unified masses of Lutetium compound; and
adding stabilizer material to the container to secure the unified masses to each other and form a radiation calibration source for calibrating a radiation detection device.

14. A method as in claim 13 further comprising:
producing the unified mass by heating the material in powder form.

15. A method as in claim 14 further comprising:
coating the unified mass with a low Z material.

16. A method as in claim 14 further comprising:
coating the fused mass with a low Z material.

17. A method as in claim 16, wherein the coating is between 0.5 and 2.0 millimeters.

18. A method as in claim 13 further comprising:
coating the unified mass with a low Z material.

19. A method comprising:
receiving an amount of material in powder form, the material including Lu-176;
producing a unified mass by applying pressure to the material to change a density of the material from a first density to a second density, the second density being greater than the first density;
filling a container made from low Z material with the unified mass and other unified masses including Lu-176; and
adding a stabilizer material to the container to secure the unified masses to each other and form a radiation calibration source for calibrating a radiation detection device.

20. A method comprising:
receiving an amount of material in powder form, the material including Lu-176;
filling a cavity of a mold with the material;
applying pressure to the material in the cavity of the mold to form a fused mass of material including Lu-176; and
forming the fused mass to be a radiation source that is movable with respect to a radiation detector, the fused mass including the Lu-176 to produce radiation to calibrate the radiation detector;
wherein applying pressure to the material changes a density of the material in powder form from less than 3 grams per cubic centimeter to a density of greater than 4 grams per cubic centimeter.

21. A method comprising:
receiving an amount of material in powder form, the material including Lu-176;
filling a cavity of a mold with the material;
applying pressure to the material in the cavity of the mold to form a fused mass of material including Lu-176;
forming the fused mass to be a radiation source that is movable with respect to a radiation detector, the fused mass including the Lu-176 to produce radiation to calibrate the radiation detector;
forming the fused mass to include at least one surface area for passing of radiation through the fused mass to the radiation detector; and
limiting a thickness of the at least one surface area to be less than 2 grams of fused material per square centimeter of the at least one surface area.

22. A method comprising:
receiving an amount of material in powder form, the material including Lu-176;
filling a cavity of a mold with the material;
applying pressure to the material in the cavity of the mold to form a fused mass of material including Lu-176;
forming the fused mass to be a radiation source that is movable with respect to a radiation detector, the fused mass including the Lu-176 to produce radiation to calibrate the radiation detector; and forming the fused mass to include an opening through which radiation from a source other than the fused mass is able to pass and strike the radiation detector without having to pass through the fused mass.

* * * * *

UNITED STATES PATENT AND TRADEMARK OFFICE
CERTIFICATE OF CORRECTION

| | |
|---|---|
| PATENT NO. | : 7,544,927 B1 |
| APPLICATION NO. | : 11/511078 |
| DATED | : June 9, 2009 |
| INVENTOR(S) | : Michael Iwatschenko-Borho |

Page 1 of 1

It is certified that error appears in the above-identified patent and that said Letters Patent is hereby corrected as shown below:

Claim 4, Column 17, Line 13: "A method as in claim 3 further comprising:" should read -- A method as in claim 1 further comprising: --

Signed and Sealed this
Twenty-third Day of August, 2011

David J. Kappos
*Director of the United States Patent and Trademark Office*